US012677368B2

(12) United States Patent
Cen et al.

(10) Patent No.: US 12,677,368 B2
(45) Date of Patent: Jul. 7, 2026

(54) FLASHLIGHT WITH USER-DEFINABLE MODES

(71) Applicant: Fenixlight Limited, Shenzhen (CN)

(72) Inventors: Liang Cen, Shenzhen (CN); Jianqiang Zeng, Shenzhen (CN); Yangcheng Shen, Shenzhen (CN); Dayuan Wang, Shenzhen (CN); Guihua Li, Shenzhen (CN)

(73) Assignee: Fenixlight Limited, Shenzhen (CN)

( * ) Notice: Subject to any disclaimer, the term of this patent is extended or adjusted under 35 U.S.C. 154(b) by 60 days.

(21) Appl. No.: 18/915,396

(22) Filed: Oct. 15, 2024

(65) Prior Publication Data

US 2026/0032797 A1 Jan. 29, 2026

(30) Foreign Application Priority Data

Jul. 26, 2024 (CN) ........................ 202411015329.5

(51) Int. Cl.

| | |
|---|---|
| ***H05B 47/17*** | (2020.01) |
| ***F21L 4/00*** | (2006.01) |
| ***F21V 23/00*** | (2015.01) |
| ***F21V 23/04*** | (2006.01) |
| ***F21Y 115/10*** | (2016.01) |
| ***H05B 47/165*** | (2020.01) |

(52) U.S. Cl.

CPC .............. *H05B 47/17* (2020.01); *F21L 4/005* (2013.01); *F21V 23/006* (2013.01); *F21V 23/0421* (2013.01); *H05B 47/165* (2020.01); *F21Y 2115/10* (2016.08)

(58) Field of Classification Search

None

See application file for complete search history.

(56) References Cited

U.S. PATENT DOCUMENTS

| | | | | |
|---|---|---|---|---|
| 2022/0015202 | A1 * | 1/2022 | Ding | F21V 23/0457 |
| 2022/0201823 | A1 * | 6/2022 | Kuta | F21L 4/085 |
| 2022/0232687 | A1 * | 7/2022 | Butler | H05B 47/165 |
| 2024/0057239 | A1 * | 2/2024 | Marcucci | H05B 45/20 |

* cited by examiner

*Primary Examiner* — Kenneth B Wells

(74) *Attorney, Agent, or Firm* — Bayramoglu Law Offices LLC

(57) ABSTRACT

The provided is a flashlight with user-definable modes, including an LED, an LED driving circuit, a control circuit, a first switch, and a second switch, wherein the LED driving circuit and the second switch are electrically connected to the control circuit, respectively, and the second switch is configured to define at least one working mode of the flashlight: a setting mode; when the second switch is in the setting mode, the control circuit configures the flashlight into N user-definable modes, and each of the user-definable modes supports M levels; and the values of N and M are both less than or equal to the preset upper limit of the flashlight. An operation method is provided to allow users to define multiple modes and customize multiple levels within each mode, thus allowing the flashlight to adapt to different indoor and outdoor application scenarios.

11 Claims, 7 Drawing Sheets

| Mode<br>Level Parameter<br>Number of levels | A1 | A2 | ... | Ai | Maximum setting value AiMAX |
|---|---|---|---|---|---|
| 1 | preset value L=1 | preset value L=2 | ... | preset value L=i | preset value L=LMAX |
| 2 | preset value L=1 | preset value L=2 | ... | preset value L=i | preset value L=LMAX |
| ... | ... | ... | ... | ... | ... |
| n | preset value L=1 | preset value L=2 | ... | preset value L=i | preset value L=LMAX |
| maximum setting value m | preset value L=1 | preset value L=2 | ... | preset value L=i | preset value L=LMAX |

FIG. 3

| Mode<br>Level Brightness<br>Number of levels | A1 | A2 | A3 | A4 | A5 |
|---|---|---|---|---|---|
| 1 | 3000 lumens | / | / | / | / |
| 2 | 30 lumens | 1500 lumens | / | / | / |
| 3 | 5 lumens | 500 lumens | 3000 lumens | / | / |
| 4 | 30 lumens | 100 lumens | 600 lumens | 1400 lumens | 3000 lumens |

FIG. 4

FLASHLIGHT WITH USER-DEFINABLE MODES

CROSS-REFERENCE TO THE RELATED APPLICATIONS

This application is based upon and claims priority to Chinese Patent Application No. 202411015329.5, filed on Jul. 26, 2024, the entire contents of which are incorporated herein by reference.

TECHNICAL FIELD

The present disclosure relates to the field of flashlights, and particularly to a flashlight with user-definable modes.

BACKGROUND

Outdoor lighting flashlights have always been one of the essential equipment for outdoor enthusiasts. With the continuous improvement of products, the performance of existing products on the market in terms of durability, waterproofing, and battery life has significantly improved compared to traditional products. However, the operation modes remain relatively fixed and monotonous, and users cannot customize the settings. For example, some flashlights only have three lighting levels: high, medium, and low. Some users find the levels too few, while others find them too many, thereby being unable to meet their individual usage habits.

SUMMARY

To overcome the shortcomings of the prior art, the present disclosure provides a flashlight with user-definable modes.

A flashlight with user-definable modes is provided, including: a light-emitting diode (LED), an LED driving circuit, a control circuit, a first switch, and a second switch, wherein the LED driving circuit, the first switch, and the second switch are electrically connected to the control circuit, the LED driving circuit is electrically connected to the LED, the second switch is configured to define at least one working mode of the flashlight: a setting mode; when the second switch is in the setting mode, the control circuit configures the flashlight into N user-definable modes, and each of the user-definable modes supports M levels; and values of N and M are both less than or equal to a preset upper limit of the flashlight.

Preferably, a first switch is further included, wherein the first switch is configured to define at least two usage states of the flashlight: an on state and an off state; and the second switch is further configured to define a second working mode of the flashlight: a lighting mode, in the on state and when the second switch is in the setting mode, and the first switch is triggered N times, the LED correspondingly flashes N times to remind the user of the current working mode of the flashlight; and in the on state and when the second switch is in the lighting mode, or in the off state and when the second switch is in the lighting mode, by long pressing the first switch for a first preset time, the flashlight begins frequency-conversion sharp-flash; and by tapping the first switch, the flashlight turns off the frequency-conversion sharp-flash.

Preferably, the first switch is a two-stage button switch, and the second switch is a dial switch.

Preferably, the user-definable modes are used to limit the number of brightness levels of the flashlight, with the brightness corresponding to each brightness level being a preset value.

Preferably, the second switch is further configured to define a third working mode of the flashlight: a locking mode, in the on state and when the second switch is in the locking mode, the flashlight is restricted from entering the off state; by long pressing the first switch for a first preset time, the flashlight is restricted from responding to frequency-conversion sharp-flash; and when the second switch exits the locking mode, the lock is released; or, in the off state and when the second switch is in the locking mode, the flashlight is restricted from entering the on state; by long pressing the first switch for a first preset time, the flashlight is restricted from responding to frequency-conversion sharp-flash; and when the second switch exits the locking mode, the lock is released.

Preferably, the first switch and the second switch are further configured to define the factory reset state of the flashlight. When not in the setting mode, by long pressing the first switch, placing the second switch in the setting mode, and after maintaining the second preset time, the flashlight enters the factory reset state.

Preferably, the flashlight includes: a tail, a tail connector, a first PCB board, a second PCB board, a gear shaft, a gear, and a rotary dial, wherein the tail connector is provided above the tail, the tail connector is provided with an accommodating cavity with an upward opening, the first PCB board is provided in the accommodating cavity, and the first switch is integrated on the first PCB board;

the tail is therein provided with a first cavity, a side wall of the tail is provided with a second cavity, the second PCB board is provided in the first cavity, a through hole is provided on an upper wall of the first cavity, a level copper piece is provided on the second PCB board at the through hole, and a level spring and a level ball abut against each other in the second cavity;

the gear shaft is mated with the gear and is inserted into the through hole after being sleeved by a rotating spring sheet, the gear shaft is in contact with the level copper piece, and an upper part of the gear abuts against the tail connector;

the rotary dial is sleeved outside the tail and the tail connector, and an inner wall of the rotary dial is in contact with the gear and the level ball, respectively; and when the rotary dial is rotated, the second switch is corresponded.

Preferably, a tail connection cover that is connected to the tail connector is further provided. The first switch is a two-stage button switch, and a silicone cap is sleeved over the two-stage button switch.

Preferably, a button support and a metal washer are provided between the two-stage button switch and the silicone cap. A waterproof ring is provided between the button support and the tail connection cover.

Preferably, a flashlight body connected to the tail is further provided. A negative spring is provided at the bottom of the second PCB board, and the negative spring is configured for an electrical connection with the battery in the flashlight body. A locking piece is provided between the flashlight body and the tail. An insulating pad is provided inside the locking piece.

The flashlight with user-definable modes provided by the present disclosure offers an operation method that allows users to define multiple modes and customize multiple levels within each mode, thus providing possibilities for adding more product functions. At the same time, the user-definable modes can be correspondingly set to multiple functions, including but not limited to the number of brightness levels of the flashlight, the duration of frequency-conversion sharp-flash, and so on, thus allowing the flashlight to meet the usage habits of the users and adapt to different indoor and outdoor application scenarios.

BRIEF DESCRIPTION OF THE DRAWINGS

FIG. 3 is a schematic diagram of a setting of level combinations in the embodiment of the present disclosure;

FIG. 4 is an exemplary diagram of a setting of level combinations in the embodiment of the present disclosure;

DETAILED DESCRIPTION OF THE EMBODIMENTS

Figure 1:
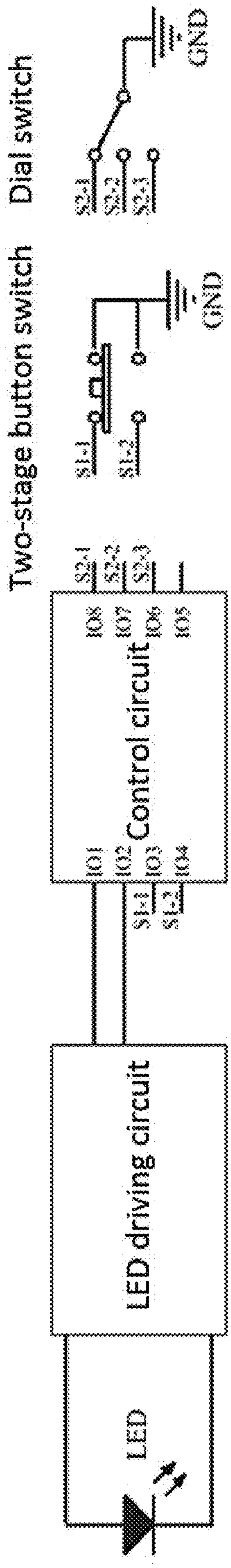
FIG. 1 is a circuit schematic diagram of a flashlight with user-definable modes according to the embodiment of the present disclosure.

In order to make the technical problems, technical solutions, and beneficial effects to be solved by the present disclosure clearer and more understandable, the following combines the drawings and embodiments to further describe the present disclosure in detail. It should be understood that the specific embodiments described herein are for the sole purpose of explaining the present disclosure and are not intended to limit the present disclosure.

A flashlight with user-definable modes is provided, as shown in FIG. 1 to FIG. 8, including: an LED, an LED driving circuit, a control circuit, and a second switch, wherein the LED driving circuit and the second switch are electrically connected to the control circuit, the LED driving circuit is electrically connected to the LED, and the second switch is configured to define at least one working mode of the flashlight: a setting mode, when the second switch is in the setting mode, the control circuit configures the flashlight into N user-definable modes, and each of the user-definable modes supports M levels; and the values of N and M are both less than or equal to the preset upper limit of the flashlight, wherein in any one of the user-definable modes, the user-definable adjustment for the brightness of each level between upper and lower limits is supported. For example, in the nth mode, the brightness L of each level can be user-defined.

As shown in FIG. 4, taking the user-definable mode configured to limit the number of brightness levels of the flashlight as an example, the maximum value of user-definable modes supported by the flashlight is set to 4 (i.e., N=4, where the preset upper limit is determined by the factory settings), and each mode corresponds to a different number of levels A. In Mode 1, there is only one level A1, with a brightness of 3000 lumens. In Mode 2, there are two levels A1 and A2, with levels of 30 lumens and 1500 lumens, respectively. Similarly, in Mode 4, there are five levels (i.e., M=5, where the preset upper limit is determined by the factory settings), ranging from A1 to A5, with levels ranging from 30 lumens to 3000 lumens. If users are not satisfied with the preset brightness of the level, they can also define the brightness of the level by themselves. For example, in Mode 1, the A1 level is 3000 lumens. If users are not satisfied, they can define by themselves the brightness to any value between the lower limit of 30 lumens and the upper limit of 3000 lumens, such as 1000 lumens.

In use, traditional flashlights require the user to sequentially press through each level from the lowest to the highest (assuming that there are four brightness levels); and if the user only wants the highest level, they must press four times to achieve their desired setting. In the embodiment, after the user triggers the second switch twice, it enters Mode 2, corresponding to two levels A1 and A2, and the user only needs to press twice to achieve their desired setting, greatly simplifying the operation process.

Further, a first switch is further included, wherein the first switch is configured to define at least two usage states of the flashlight: an on state and an off state; and the second switch is further configured to define a second working mode of the flashlight: a lighting mode. In the on state, when the second switch is in the setting mode, and the first switch is triggered N times, the LED correspondingly flashes N times to remind the user of the current working mode of the flashlight. In the on state and when the second switch is in the lighting mode, or in the off state and when the second switch is in the lighting mode, by long pressing the first switch for a first preset time, the flashlight begins frequency-conversion sharp-flash; and by tapping the first switch, the flashlight turns off the frequency-conversion sharp-flash.

Specifically, when the user needs to use five brightness levels, with the flashlight in the on state and the second switch in the setting mode, by pressing the first switch four times in the meantime the LED flashes four times, the user knows that they are setting a custom mode; and when the user switches the second switch to the lighting mode, the setting of five levels is completed. During use, when the second switch is in lighting mode, the user can cycle the selection for the five brightness levels by triggering the first switch.

It is understandable that the user-definable mode is not limited to restricting the number of brightness levels of the flashlight. As shown in FIG. 3, a schematic diagram of a setting of level combinations, in the setting mode, various level combinations that have been preset by the program can be set, including but not limited to the number of levels, the lumen value of levels, the constant lighting, or the flash modes, etc. The number of modes is 1 to m. A represents the level, and the number of levels is 1 to iMAX. The parameter corresponding to each level Ai is L, with an upper limit value of LMAX. The m, iMAX, L, and LMAX are all determined by factory settings. When the user needs to change the brightness of the Aith level in the Nth mode, the second switch is switched in the setting mode, which defaults to the last selected mode. The LED light flashes the corresponding number of times. The first switch is pressed down N times, and the LED light flashes N times, indicating the selection for mode N. Then the first switch is long pressed to enter brightness user-defining, and the LED lights up the first level of the current mode. The first switch is released and then pressed down i times to select the Aith level, and the brightness is Li. At this time, the first switch is long pressed again, and the brightness Li will increase, which will cycle within the preset lower limit to upper limit until the brightness is satisfactory. Then the switch is released to determine the brightness. If the brightness is still not satisfactory, the first switch can be long pressed again to continue adjusting. After the adjustment is completed, the first switch is pressed shortly to switch to the next level. If no further adjustment is needed, the second switch can be placed in lighting mode to exit user-definable mode and use normally. The above actions can be repeated to use-define the brightness for each level in each mode.

Thus, the user can achieve the objective of using different level parameters in different scenarios through the user-definable mode.

Specifically, as shown in FIG. 1, the first switch S1 and the second switch S2 are connected to the IO ports of the control circuit. By changing 0 and 1 level signals through the on and off of the switches and feeding them back to the control circuit, the control circuit drives the LED The operation mode of the first switch at least includes defining different states based on the duration of the circuit being in on-time, such as long press (S1-2 contact connection time is greater than t, which is usually preset to 0.5 seconds), short press (S1-2 contact connection time is shorter than t, which is usually preset to 0.5 seconds), or half press (S1-1 contact is disconnected, and S1-2 contact is not connected), corresponding to different circuit on/off states. For example, a long press of the first switch enables the on state of the flashlight, and another long press of the first switch enables the off state of the flashlight. Meanwhile, in conjunction with whether the current state is the on state or off state and the working mode of the second switch, long press, short press, or half-press of the first switch can also be defined as level adjustment, setting selection, or brightness user-defining functions. It is understandable that the operation mode of the second switch can be the same as or different from that of the first switch. For example, in one embodiment, the first switch is a two-stage button switch, and the second switch is a dial switch; or, both switches are two-stage or three-stage button switches, or both are dial switches, specifically depending on the hardware design of the flashlight. It can be understood that the first switch and the second switch can be one or multiple, not limited to the above description. As long as there is a mechanism that can generate signal on/off, different signals can be generated by the length of the on time to achieve operation.

When the second switch is a dial switch, different contacts are connected by rotating the dial switch to feed different signals to the control circuit, thereby entering different working modes. The working modes include at least lighting mode and setting mode.

Figure 2:
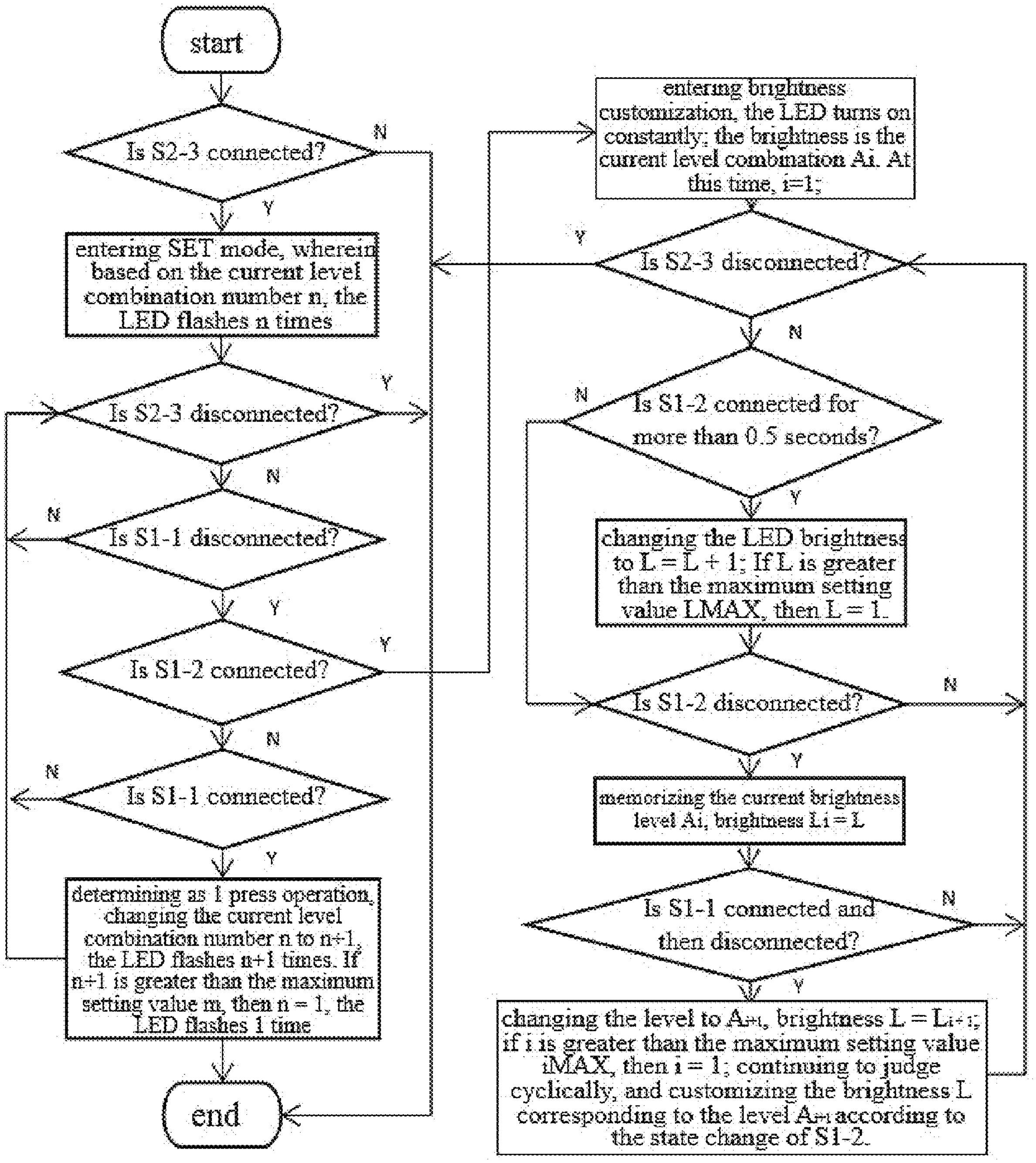
FIG. 2 is a program logic diagram of user-defined operations in the embodiment of the present disclosure.

In the operation of the user setting the custom level, referring to the flowchart shown in FIG. 2, S2-3 represents the setting mode. When S2-3 is turned on, the user begins to set the user-definable mode. The on and off of S1-1 and S1-2 represent different operation signals when the user triggers the first switch S1. For example, when S1-1 is off and S1-2 connection time is greater than the preset time, it is an operation signal and represents a long press of the first switch S1 by the user to enter the brightness user-defining; when the user half-presses the first switch S1, the two-stage button switch is between S1-1 and S1-2, and the operation signal transmitted to the control circuit board is to switch levels under a user-definable mode.

By operating S2 to enter the user-definable mode, different level combinations are selected by multiple times of half pressing and the user-defined brightness is adjusted by long pressing through S1 operation in such mode, and feedback is provided to the user through the on/off of the LED and brightness changes. In theory, enough levels can be set to fully meet the needs of the user if the program storage space of the controller and LED power are sufficient.

Further, in the on state and when the second switch is in the lighting mode, or in the off state and when the second switch is in the lighting mode, by long pressing the first switch for a first preset time, the flashlight begins frequency-conversion sharp-flash; and by tapping the first switch, the flashlight turns off the frequency-conversion sharp-flash. Frequency-conversion sharp-flash is suitable for outdoor rescue, signaling, etc.

Further, the second switch is also configured to define a third working mode of the flashlight: a locking mode. The locking mode is used to prevent accidental touches when turning on or off. In the on state, when the second switch is in the locking mode, the flashlight will not turn off by accidental touch; by long pressing the first switch for a first preset time, the flashlight is restricted from responding to frequency-conversion sharp-flash; and when the second switch exits the locking mode, the lock is released; or in the off state, when the second switch is in the locking mode, the flashlight is restricted from entering the on state; by long pressing the first switch for a first preset time, the flashlight is restricted from responding to frequency-conversion sharp-flash; and when the second switch exits the locking mode, the lock is released.

Figure 5:
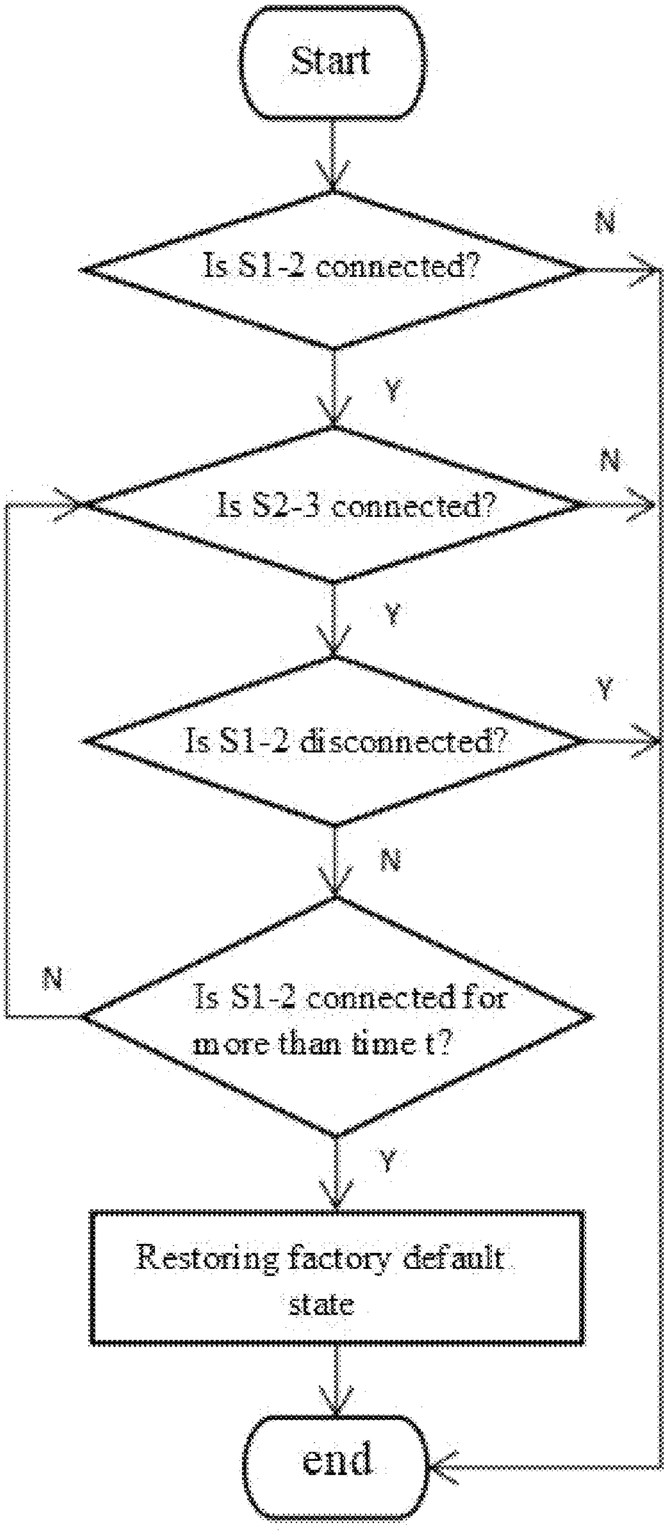
FIG. 5 is a flowchart of a factory reset state in the embodiment of the present disclosure.
Figure 6:
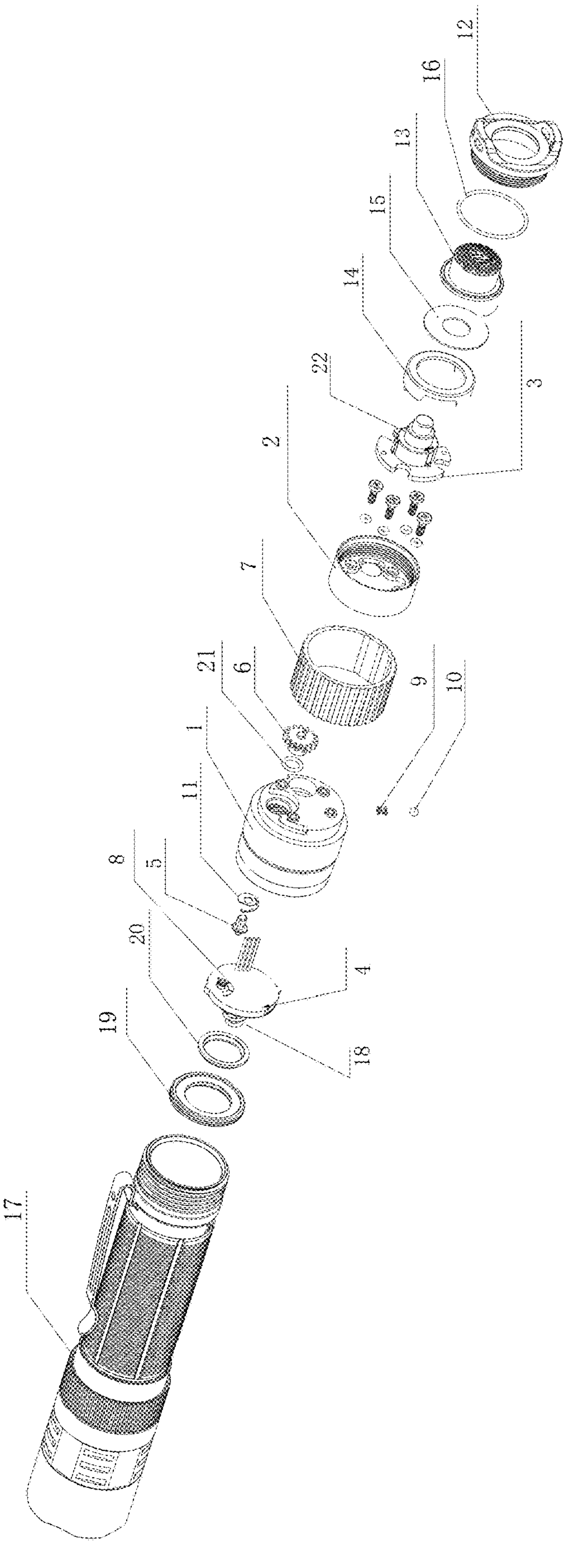
FIG. 6 is an exploded view of a flashlight with user-definable modes in the embodiment of the present disclosure.
Figure 7:
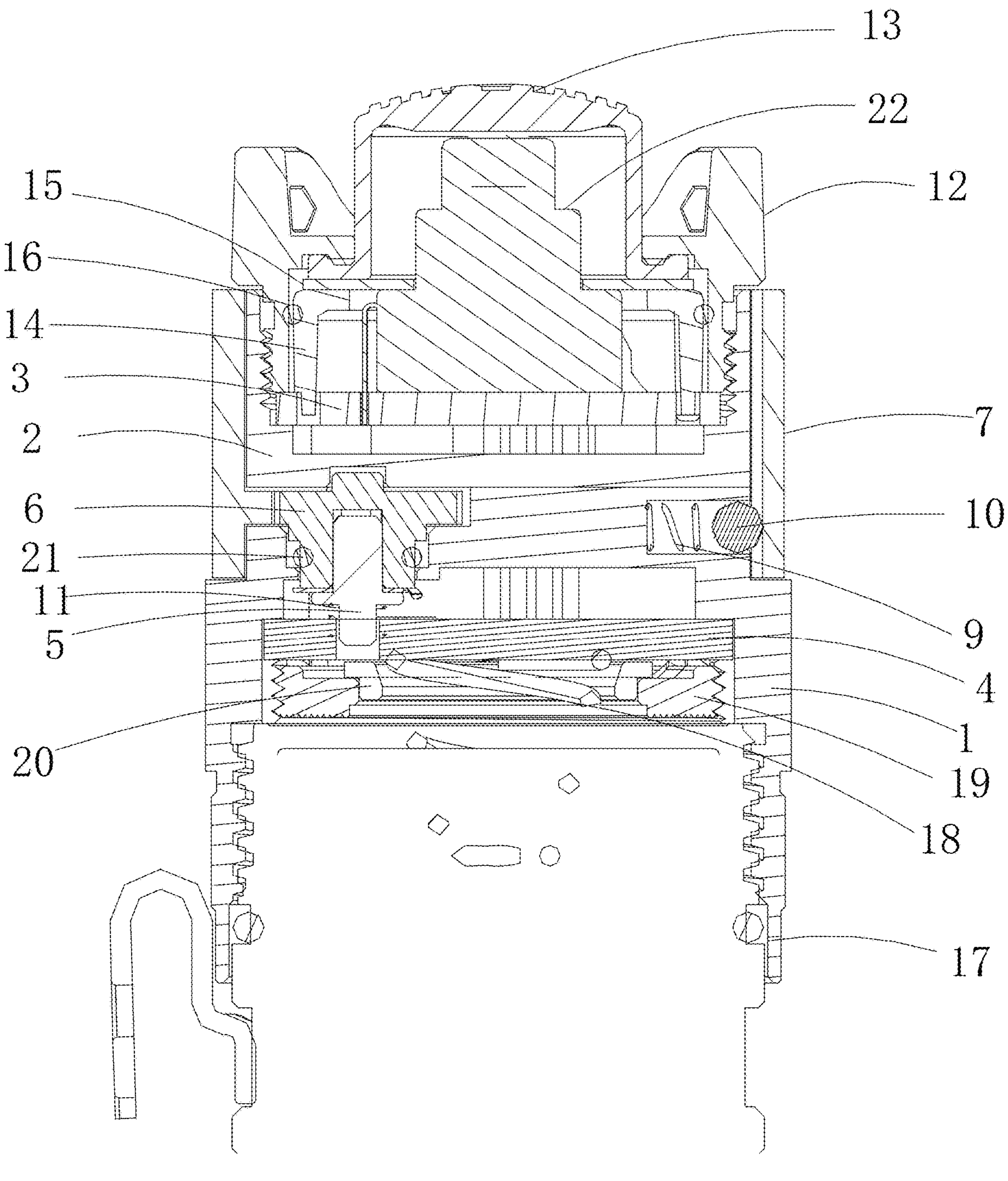
FIG. 7 is a sectional view of a flashlight with user-definable modes in the embodiment of the present disclosure.
Figure 8:
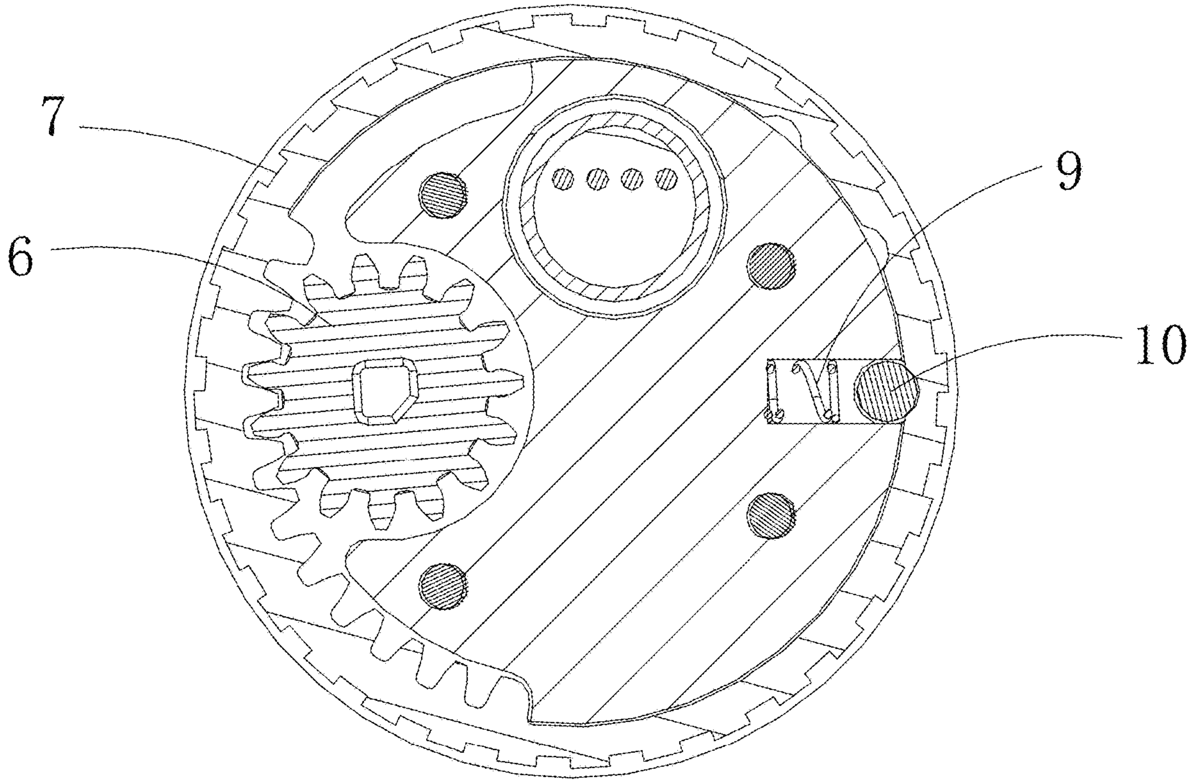
FIG. 8 is a transversely sectional view of a tail in the embodiment of the present disclosure.

Further, the first switch and the second switch are further configured to define the factory reset state of the flashlight. When not in the setting mode, by long pressing the first switch, placing the second switch in the setting mode, and after maintaining the second preset time, the flashlight enters the factory reset state. Specifically, as shown in FIG. 5, when not in the setting mode, i.e., when S2-3 is not turned on, by pressing and holding the first switch S1-2 and simultaneously toggling the second switch S2 to the S2-3 position to turn on, if the state of S1-2 remains held over a time t, the flashlight will reset to the factory default settings. If the switch S1-2 or S2-3 is turned off within the time t, the operation ends, and does not respond to the operation of the factory default settings.

Further, the flashlight includes: a tail 1, a tail connector 2, a first PCB board 3, a second PCB board 4, a gear shaft 5, a gear 6, and a rotary dial 7.

The tail connector is provided above the tail, the tail connector is provided with an accommodating cavity with an upward opening, the first PCB board is provided in the accommodating cavity, and the first switch is integrated on the first PCB board, i.e., the two-stage button switch 22.

The tail is therein provided with a first cavity, the side wall of the tail is provided with a second cavity, the second PCB board is provided in the first cavity, a through hole is provided on the upper wall of the first cavity, a level copper piece 8 is provided on the second PCB board at the through hole, and a level spring 9 and a level ball 10 abut against each other in the second cavity.

The gear shaft is mated with the gear and is inserted into the through hole after being sleeved by a rotating spring sheet 11, the gear shaft is in contact with the level copper piece, and the upper part of the gear abuts against the tail connector.

The rotary dial is sleeved outside the tail and the tail connector, and the inner wall of the rotary dial is in contact with the gear and the level ball, respectively.

When the rotary dial is rotated, it corresponds to the second switch, i.e., the dial switch.

Further, a tail connection cover 12 that is connected to the tail connector is further provided. The first switch is a two-stage button switch, and a silicone cap 13 is sleeved over the two-stage button switch.

Further, a button support 14 and a metal washer 15 are provided between the two-stage button switch and the silicone cap. A waterproof ring 16 is provided between the button support and the tail connection cover.

Further, the flashlight is further provided with a flashlight body connected to the tail 17. A negative spring 18 is provided at the bottom of the second PCB board, and the negative spring is configured for an electrical connection with the battery in the flashlight body. A locking piece 19 is provided between the flashlight body and the tail.

Further, an insulating pad 20 is provided inside the locking piece. A waterproof ring 21 is provided between the gear and the gear shaft.

The assembly sequence of the flashlight is as follows.

(1) After sleeving the gear 6 by a waterproof ring 20 and arranging it into the tail 1, the gear shaft 5 is arranged with the rotating spring sheet 11 and inserted into the gear for fixation.

(2) The second PCB board 4 is arranged into the tail assembly, and the locking piece 19, provided with the insulating pad 20, locks the second PCB board 4 within the tail assembly.

(3) The tail assembly is provided with the level spring 9 and the level ball 10, and after sleeving the rotary dial 7, it is mounted into the tail connector 2. After that, the tail connector is then tightened with a screw provided with a waterproof ring 16.

(4) The first PCB board 3 is mounted into the tail assembly, and after soldering the wire for connection, the button support 14 and metal washer 15 are sleeved onto the switch.

(5) The tail connection cover, provided with the silicone cap 13 and waterproof ring 16, is locked onto the tail assembly.

The above explanation of the flashlight with user-definable modes provided by the present disclosure is intended to facilitate the understanding of the present disclosure; however, the implementation of the present disclosure is not limited to the described embodiments. Any changes, modifications, substitutions, combinations, or simplifications made without departing from the principles of the present disclosure should be considered equivalent substitutions and should be included within the scope of protection of the present disclosure.

What is claimed is:

1. A flashlight with user-definable modes, comprising: a light-emitting diode (LED), an LED driving circuit, a control circuit, a first switch and a second switch, wherein the LED driving circuit and the second switch are electrically connected to the control circuit, respectively; the LED driving circuit is electrically connected to the LED; and the second switch is configured to define at least one working mode of the flashlight: a setting mode; when the second switch is in the setting mode, the control circuit configures the flashlight into N user-definable modes, and each of the N user-definable modes supports M levels; and values of N and M are both more than or equal to one and less than or equal to a preset upper limit of the flashlight, wherein the first switch is configured to define at least two usage states of the flashlight: an on state and an off state; and the second switch is further configured to define a second working mode of the flashlight: a lighting mode;

in the on state and when the second switch is in the setting mode, and the first switch is triggered N times, the LED correspondingly flashes N times to remind a user of a current working mode of the flashlight; and in the on state and when the second switch is in the lighting mode, or in the off state and when the second switch is in the lighting mode, by long pressing the first switch for a first preset time, the flashlight begins frequency-conversion sharp-flash; and by tapping the first switch, the flashlight turns off the frequency-conversion sharp-flash, wherein in any one of the N user-definable modes, adjusting a brightness of each of the M levels between upper and lower limits is supported.

2. The flashlight according to claim 1, wherein the first switch is a two-stage button switch, and the second switch is a dial switch, wherein at least one first switch is provided.

3. The flashlight according to claim 1, wherein the N user-definable modes are configured to limit the number of brightness levels of the flashlight, with a brightness corresponding to each of the brightness levels being a preset value.

4. The flashlight according to claim 1, wherein the second switch is further configured to define a third working mode of the flashlight: a locking mode;

in the on state and when the second switch is in the locking mode, the flashlight is restricted from entering the off state; by long pressing the first switch for a first preset time, the flashlight is restricted from responding to the frequency-conversion sharp-flash; and when the second switch exits the locking mode, a lock is released; or, in the off state and when the second switch is in the locking mode, the flashlight is restricted from entering the on state; by long pressing the first switch for a first preset time, the flashlight is restricted from responding to the frequency-conversion sharp-flash; and when the second switch exits the locking mode, the lock is released.

5. The flashlight according to claim 4, wherein the first switch and the second switch are further configured to define a factory reset state of the flashlight, and when not in the setting mode, by long pressing the first switch, and arranging the second switch in the setting mode, and after maintaining a second preset time, the flashlight enters the factory reset state.

6. The flashlight according to claim 4, wherein the flashlight comprises: a tail, a tail connector, a first PCB board, a second PCB board, a gear shaft, a gear, and a rotary dial, wherein the tail connector is provided above the tail, the tail connector is provided with an accommodating cavity with an upward opening, the first PCB board is provided in the accommodating cavity, and the first switch is integrated on the first PCB board;

the tail is therein provided with a first cavity, a side wall of the tail is provided with a second cavity, the second PCB board is provided in the first cavity, a through hole is provided on an upper wall of the first cavity, a level copper piece is provided on the second PCB board at the through hole, and a level spring and a level ball abut against each other in the second cavity;

the gear shaft is mated with the gear and is inserted into the through hole after being sleeved by a rotating spring sheet, the gear shaft is in contact with the level copper piece, and an upper part of the gear abuts against the tail connector;

the rotary dial is sleeved outside the tail and the tail connector, and an inner wall of the rotary dial is in contact with the gear and the level ball, respectively; and when the rotary dial is rotated, the second switch is corresponded.

7. The flashlight according to claim 6, further comprising a tail connection cover connected to the tail connector, wherein the first switch is a two-stage button switch, and a silicone cap is sleeved over the two-stage button switch.

8. The flashlight according to claim 7, wherein a button support and a metal washer are provided between the two-stage button switch and the silicone cap, and a waterproof ring is provided between the button support and the tail connection cover.

9. The flashlight according to claim 6, further comprising a flashlight body connected to the tail, wherein a negative spring is provided at a bottom of the second PCB board, the negative spring is configured for electrical connection with a battery in the flashlight body, a locking piece is provided between the flashlight body and the tail, and an insulating pad is provided inside the locking piece.

10. The flashlight according to claim 2, wherein the second switch is further configured to define a third working mode of the flashlight: a locking mode;

in the on state and when the second switch is in the locking mode, the flashlight is restricted from entering the off state; by long pressing the first switch for a first preset time, the flashlight is restricted from responding to the frequency-conversion sharp-flash; and when the second switch exits the locking mode, a lock is released; or, in the off state and when the second switch is in the locking mode, the flashlight is restricted from entering the on state; by long pressing the first switch for a first preset time, the flashlight is restricted from responding to the frequency-conversion sharp-flash; and when the second switch exits the locking mode, the lock is released.

11. The flashlight according to claim 3, wherein the second switch is further configured to define a third working mode of the flashlight: a locking mode;

in the on state and when the second switch is in the locking mode, the flashlight is restricted from entering the off state; by long pressing the first switch for a first preset time, the flashlight 18 restricted from responding to the frequency-conversion sharp-flash; and when the second switch exits the locking mode, a lock is released; or, in the off state and when the second switch is in the locking mode, the flashlight is restricted from entering the on state; by long pressing the first switch for a first preset time, the flashlight is restricted from responding to the frequency-conversion sharp-flash; and when the second switch exits the locking mode, the lock is released.

* * * * *